United States Patent [19]

Luczak et al.

[11] Patent Number: 4,613,582

[45] Date of Patent: Sep. 23, 1986

[54] METHOD FOR MAKING TERNARY FUEL CELL CATALYSTS CONTAINING PLATINUM COBALT AND CHROMIUM

[75] Inventors: Francis J. Luczak, Glastonbury; Douglas A. Landsman, West Hartford, both of Conn.

[73] Assignee: United Technologies Corporation, Hartford, Conn.

[21] Appl. No.: 575,360

[22] Filed: Jan. 30, 1984

Related U.S. Application Data

[62] Division of Ser. No. 459,002, Jan. 17, 1983, Pat. No. 4,447,506.

[51] Int. Cl.[4] .................... B01J 21/18; B01J 23/64; B01J 23/86
[52] U.S. Cl. .................................. 502/185; 502/184
[58] Field of Search ...................... 502/184, 185, 313

[56] References Cited

U.S. PATENT DOCUMENTS

| | | | |
|---|---|---|---|
| 3,291,753 | 12/1966 | Thompson | 502/101 |
| 3,380,934 | 4/1968 | Batzold | 502/339 |
| 3,432,362 | 3/1969 | Kroll | 429/34 |
| 4,316,944 | 2/1982 | Landsman et al. | 429/44 |
| 4,358,475 | 11/1982 | Brown et al. | 427/34 |

FOREIGN PATENT DOCUMENTS 1047933  11/1966  United Kingdom .

*Primary Examiner*—W. J. Shine
*Attorney, Agent, or Firm*—Alan C. Cohen

[57] ABSTRACT

An improved ternary noble metal-containing, alloy catalyst which has a catalytic activity for the electrochemical reduction of oxygen greater than two and one-half times that of the supported unalloyed noble metal alone. In addition, a disclosure of the method of preparing said catalyst is by intimately contacting two metallic elements with a supported noble metal, then heating this material to form the ternary alloy catalyst. This catalyst has particular utility for the electrochemical reduction of oxygen which makes it particularly useful as a cathode in acid fuel cells. The preferred embodiment of this catalyst is finely divided platinum alloyed with chromium and cobalt supported on an electrically conductive carbon-black support material.

6 Claims, 1 Drawing Figure

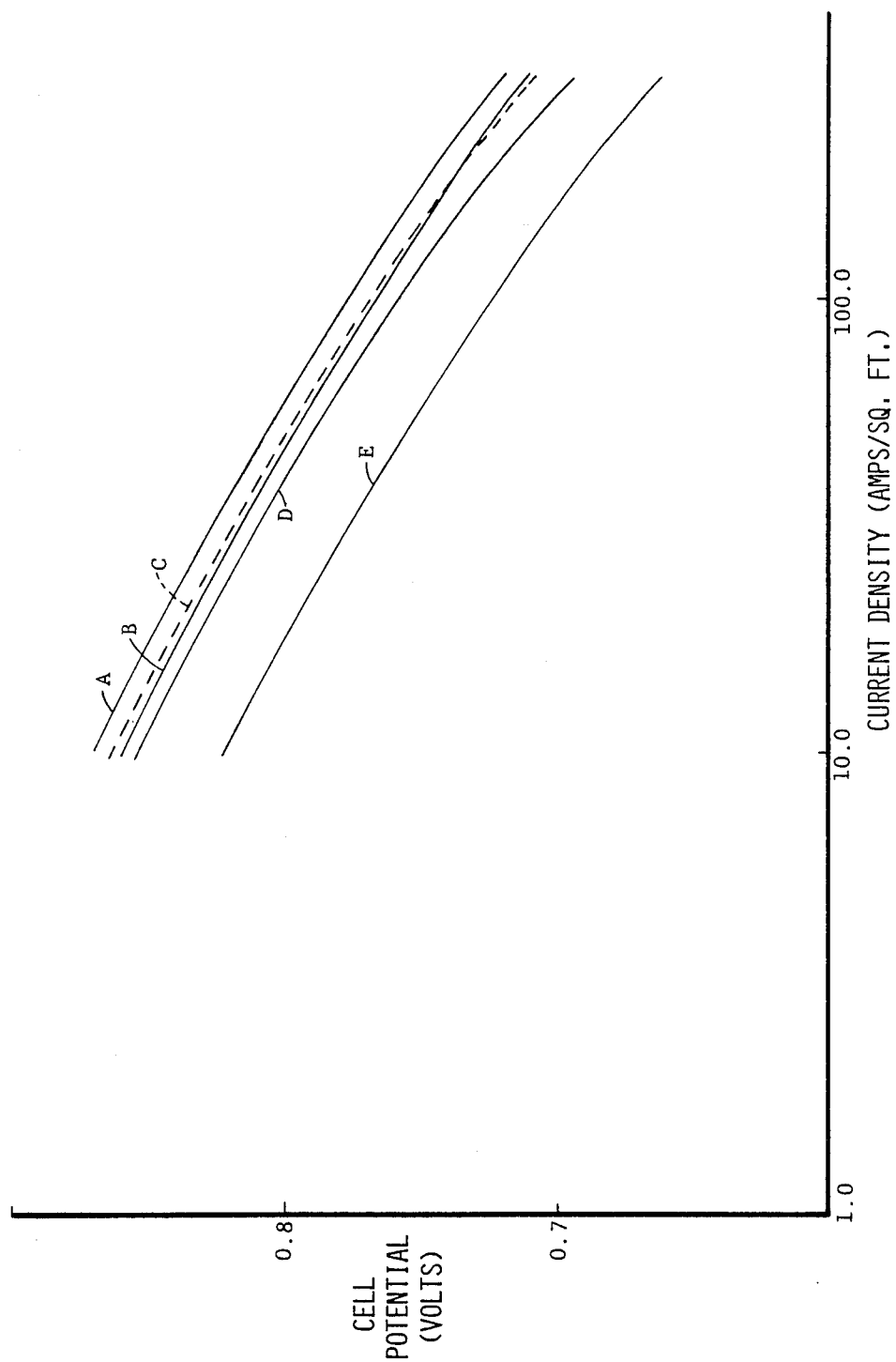

METHOD FOR MAKING TERNARY FUEL CELL CATALYSTS CONTAINING PLATINUM COBALT AND CHROMIUM

CROSS REFERENCE TO RELATED APPLICATION

This is a division of application Ser. No. 459,002, filed on Jan. 17, 1983, now U.S. Pat. No. 4,447,506.

DESCRIPTION

1. Technical Field

The present invention relates to noble metal catalysts, and especially to ternary alloys of platinum for use in fuel cell electrodes and other catalytic structures.

2. Background Art

A fuel cell is an electrochemical device in which the energy from a chemical reaction is converted to direct current electricity. The basic concept, which was described by Sir William Grove about 1840, comprises an anode and a cathode separated by an electrolyte.

During operation a continuous flow of fuel, commonly hydrogen, is fed to the anode while, simultaneously, a continuous flow of oxidant, commonly air, is fed to the cathode. The fuel is oxidized at the anode with a release of electrons through the agency of a catalyst. These electrons are then conducted to the cathode through wires external to the cell, where the oxidant is reduced and the electrons are consumed, again through the agency of a catalyst. The constant flow of electrons from the anode to the cathode constitutes an electrical current which can be made to do useful work.

The type of fuel cell which is in the most advanced state of development, and which is being used in commercial power plants to generate electricity at the 10–5,000 KW level, contains concentrated phosphoric acid as electrolyte and operates at 325°–425° F.

The efficiency at which the cell operates is determined by several parameters, not the least of which is the activity of the cathode catalyst. This activity is measured by the rate at which the electrochemical reduction of the oxidant proceeds on the surface of the catalyst in the presence of the electrolyte at a specified temperature and electrochemical potential. There have been many attempts over the years to find inexpensive, highly active catalysts. However, the choice of materials is severely limited since any catalyst which is developed for this purpose must not only have a high activity for the electrochemical reduction of oxygen, but must be capable of withstanding a working environment of relatively high temperatures while being exposed to a strong acid.

Initially, catalysts were made of platinum or other noble metals, as these materials were best able to withstand the corrosive environment of the electrochemical cell. Later, these noble metals were dispersed over the surface of electrically conductive supports (e.g. carbon black) to increase the surface area of the catalyst which in turn increased the number of reactive sites leading to improved efficiency of the cell. It was then discovered that certain alloys of noble metals exhibited increased catalytic activity, further increasing fuel cell efficiencies. Some of these alloys are platinum-chromium (commonly assigned U.S. Pat. No. 4,316,944) and platinum-vanadium (commonly assigned U.S. Pat. No. 4,202,934). These increases in fuel cell efficiency coupled with the increase in cost of other energy sources contributes to even greater utilization of the fuel cell. Therefore, the search continues for stable catalysts with increased activity for the electrochemical reduction of oxygen over that which is presently available.

DISCLOSURE OF THE INVENTION

The present invention is directed to a noble metal ternary alloy catalyst, which has a mass activity for the electrochemical reduction of oxygen greater than two and one-half times that of the unalloyed noble metal. This catalyst comprises a ternary alloy of platinum, chromium and cobalt supported on an electrically conductive carbon black.

Another aspect of the invention is a fuel cell containing the above-described catalyst.

Another aspect of the invention is a process for making the above-described catalyst.

The foregoing and other features and advantages of the present invention will become more apparent in the light of the following description and accompanying drawing.

BRIEF DESCRIPTION OF THE DRAWING

The FIGURE demonstrates cell voltages as a function of current density for various cathodes incorporating alloy catalysts and platinum.

BEST MODE FOR CARRYING OUT THE INVENTION

In the following discussion of this invention and in the appended claims, whenever catalytic activity comparisons are made, they are comparisons of mass activity. In the present context the mass activity of a cathode catalyst is defined as the maximum current obtained from the catalyst when fabricated into a gas diffusion electrode and operated at 0.9 volt in oxygen at one atmosphere pressure in 99% phosphoric acid at 375° F. The potential is measured relative to an unpolarized $H_2$/Pt reference electrode at the same pressure and temperature in the same electrolyte. Although the test electrode may contain less than 1 milligram of the catalyst, the current is normalized to what would be obtained from this amount and the mass activity is expressed as milliamps per milligram of catalyst.

An increase in the mass activity of a catalyst may be achieved by either increasing the surface area of the catalyst, therefore creating a greater number of reactive sites, or by increasing its specific activity. The specific activity is the $O_2$ reduction current per unit surface area of the noble metal (i.e. $mA/cm^2$). The greater mass activity of the ternary alloy of the present invention in comparison to the mass activities of both the unalloyed and binary alloy catalysts is attained through an increase in the specific activity.

The basic process for producing the subject invention may be used to produce other ternary catalysts recited in this application. The process comprises intimately contacting a finely divided noble metal with a solution containing a compound of cobalt and a solution containing a compound of one of the elements from transition Groups IV to VII (Ti, V, Cr, Mn, Zr, etc). The intimate contact is accomplished by continuous stirring of the mixture and adjusting the acidity to promote adsorption of the compounds on the noble metal. These materials being in intimate contact are dried and then heated in a reducing environment at a temperature from about 815° C. to about 980° C. to form the catalyst. This procedure is applicable to the preparation of both supported and unsupported catalysts. However, since finely divided unsupported noble metals are generally limited to surface areas of less than 50 m²/gm, the described method is best practiced using a finely divided noble metal deposited on electrically conductive support material which can be prepared with surface areas in excess of 100 m²/gm. Some electrically conductive supports which are available commercially and can be used are acetylene-black (Gulf Oil Corporation) or Vulcan XC-72, an oil furnace black from Cabot Corporation. These carbon blacks may be used as supports in their as-received condition or may be graphitized to increase their oxidation resistance prior to depositing the noble metal. The noble metal can be deposited onto an electrically conductive support by any conventional means disclosed in the prior art (i.e. commonly assigned U.S. Pat. No. 4,137,373 the disclosure of which is incorporated by reference), or the finely divided noble metal already supported may be purchased commercially. In addition to providing a support for the catalyst these carbon supports will provide the reducing environment necessary to form the alloy during heat treatment.

Catalysts prepared using the above method are ternary alloy catalysts containing a noble metal, a metal from transition Group IV to Group VII and cobalt. It has been determined that the addition of cobalt significantly enhances the overall catalytic activity relative to the unalloyed noble metal constituent. Platinum is the preferred noble metal while chromium is the preferred metal selected from the defined Groups. Although this invention has been described in terms of platinum-chromium-cobalt, if one were willing to suffer a slight decrease in activity (note the Table), other metals selected from the above-described Groups can be substituted for the chromium.

EXAMPLE 1

A platinum-chromium-cobalt alloy catalyst of high surface area supported on carbon was prepared in the following manner:

Five grams of commercially available high surface area platinum-on-graphitized-carbon-black (containing 10% platinum by weight) was dispersed in 200 ml of water followed by ultrasonic blending for about 15 minutes. The pH was adjusted to about 8 with dilute ammonium hydroxide solution to aid in the dispersion of the supported catalyst. Stirring was continued during and after pH adjustment. A solution of 1 gm of ammonium chromate in 20 ml of water was then added to the pH-adjusted solution. Following this addition the pH was adjusted to about 5.5 by addition of dilute hydrochloric acid to facilitate adsorption of the chromium onto the platinum. The solution was then stirred, to intimately contact the platinum-on-graphitized-carbon-black and the chromium salt, for about 15 minutes. A separate solution of 3 gm of cobaltous nitrate in 20 ml of water was then added to the above acidic solution. Both the ammonium chromate and cobaltous nitrate are added as solutions to enhance the dispersion of these metals onto the catalyst, while the stirring brings the metals into the intimate contact required for proper adsorption onto the supported platinum catalyst. The pH was maintained at about 5.5 by incremental additions of dilute hydrochloric acid. Stirring was employed during this procedure and continued for about 15 minutes after the addition, to intimately contact all the constituents. After filtering, the solids were dried at about 90° C. and sifted through an 80 mesh screen.

The sifted solids were then heat treated at about 900° C. in flowing nitrogen for 1 hour to form the platinum-chromium-cobalt alloy catalyst. The catalyst prepared according to this method, which showed an increase in catalytic activity, had a metallic composition comprising cobalt 11.3% by weight, chromium 8.9% by weight with the balance being platinum. Other satisfactory catalysts made using this method contained concentrations of cobalt from 8-14% by weight, chromium 6-12% by weight, with platinum being the balance. In all cases the platinum was supported on graphitized carbon-black.

EXAMPLE 2

A second ternary alloy catalyst was prepared using the method of Example 1. This catalyst was comprised of platinum, vanadium, and cobalt. The vanadium was introduced onto the catalyst in place of the chromium by substituting a solution of ammonium meta vanadate in place of the ammonium chromate solution.

Both of these catalysts were tested to demonstrate their superiority over the supported unalloyed catalyst as well as their respective binary counterparts. Cathodes were made from each of the alloys that had been prepared as described in the above Examples, and tested in subscale 2"×2" laboratory fuel cells. The cells were run and the voltage measured at a current density of 200 ASF (amps per square foot). All of the electrodes contained the same platinum loading i.e. 0.5 mg of Pt/cm² electrode. Each of the catalyst's performance was evaluated at standard conditions i.e. a cell current density of 200 ASF, 99% phosphoric acid electrolyte, 190° C. cell temperature with air at a high flow rate as the reacting gas and with the voltage at the given current corrected to eliminate cell resistance (IR-free).

The data in the Table demonstrates an increase in the catalytic activity for the electrochemical reduction of oxygen in excess of two and one-half times that of the supported unalloyed platinum, for the platinum-chromium-cobalt catalyst of this invention.

The Table also shows that the ternary alloy catalyst of platinum-chromium-cobalt has an increase in its activity for the electrochemical reduction of oxygen of 20% over the binary alloy catalyst of platinum-chromium. The platinum-vanadium-cobalt ternary alloy catalyst also has a higher activity compared to the platinum-vanadium binary alloy albeit not as great as that of the preferred platinum-chromium-cobalt catalyst.

TABLE

| Supported Alloy Catalyst | $O_2$ Activity @ 0.9 volts mA/mg Pt | $H_2$/Air IR-Free Cell Voltage @ 375° F. @ 200 ASF (190.56° C.) |
|---|---|---|
| Pt—Cr—Co | 52 | 0.742 |
| Pt—Cr | 43 | 0.735 |
| Pt—V—Co | 42 | 0.735 |
| Pt—V | 39 | 0.720 |
| Pt | 20 | 0.680 |

In addition an increase in the current density at a fixed voltage was observed for these supported ternary alloy catalysts in excess of 20% over its binary alloy counterpart without the cobalt. This is illustrated in the FIGURE.

The letters in the FIGURE represent the following catalysts, "A" platinum-chromium-cobalt, "B" platinum-chromium, "C" platinum-vanadium-cobalt, "D" platinum-vanadium and "E" platinum. Each of these catalysts is supported on the same graphitized carbon support material.

This increase in current density has considerable significance in light of the fact that current density is a measure of the rate at which a fuel cell can do useful work and the voltage of a cell is a measure of its efficiency; therefore, a fuel cell utilizing catalysts described in the present invention will be able to increase the amount of work the cell can produce while the cell operates at the same efficiency.

The alloy catalysts of this invention have particular utility as catalysts for the electrochemical reduction of oxygen. This activity makes these catalysts particularly suitable for use in acid fuel cells. However, these catalysts may find alternative applications in the chemical, pharmaceutical, automotive and anti-pollution fields.

Although the invention has been shown and described with respect to detailed embodiments thereof, it should be understood by those skilled in the art that various changes and omissions in form and detail may be made therein without departing from the spirit and the scope of the invention.

We claim:

1. A method for making a ternary metal alloy catalyst comprising intimately contacting a finely divided noble metal supported on electrically conductive carbon-black with a solution of a compound of an element selected from transition Groups IV, V, VI and VII and a compound of cobalt, heating and reducing the intimately contacted materials in a nitrogen atmosphere to form the catalyst.

2. The method of claim 1 wherein the noble metal is platinum.

3. The method of claim 1 wherein the cobalt compound is cobaltous nitrate.

4. The method of claim 1 wherein the element is chromium.

5. The method of claim 4 wherein the compound is ammonium chromate.

6. A method for making a supported ternary metal alloy catalyst comprising:
dispersing finely divided platinum supported on electrically conductive carbon-black particles in water; preparing separate aqueous solutions of cobalt and chromium compounds; sequentially adding each solution to the platinum-carbon dispersion; adsorbing each compound onto the platinum-carbon-black by intimately contacting them with the particles by stirring, separating the particles then heating and reducing these particles in a nitrogen atmosphere at temperatures from about 815° C. to about 980° C. to form the supported ternary alloy catalyst.

* * * * *